US008819533B2

(12) United States Patent
Trotto et al.

(10) Patent No.: US 8,819,533 B2
(45) Date of Patent: Aug. 26, 2014

(54) INTERACTIVE MULTIMEDIA DIARY

(75) Inventors: Laureen A. Trotto, Newtown, CT (US);
Maureen T. Trotto, Monroe, CT (US);
Robert A. Ruginis, Bristol, RI (US);
Robert W. Jeffway, Jr., Leeds, MA (US)

(73) Assignee: Mattel, Inc., El Segundo, CA (US)

( * ) Notice: Subject to any disclaimer, the term of this patent is extended or adjusted under 35 U.S.C. 154(b) by 2356 days.

(21) Appl. No.: 11/563,965

(22) Filed: Nov. 28, 2006

(65) Prior Publication Data

US 2007/0124673 A1    May 31, 2007

Related U.S. Application Data

(60) Provisional application No. 60/739,946, filed on Nov. 28, 2005.

(51) Int. Cl.
*G06F 17/21* (2006.01)
*G06F 3/0483* (2013.01)
*G06Q 10/00* (2012.01)
*G06F 1/16* (2006.01)

(52) U.S. Cl.
CPC .............. *G06Q 10/00* (2013.01); *G06F 3/0483* (2013.01); *G06F 1/1626* (2013.01)
USPC ........... 715/200; 715/201; 715/202; 715/203; 715/204

(58) Field of Classification Search
USPC ................................................. 715/200–204
See application file for complete search history.

(56) References Cited

U.S. PATENT DOCUMENTS

| 3,999,050 | A | * | 12/1976 | Pitroda | 708/112 |
| 5,689,687 | A | * | 11/1997 | Nishioka | 345/556 |
| 5,717,820 | A | * | 2/1998 | Hamasaki et al. | 704/231 |
| 5,914,706 | A | * | 6/1999 | Kono | 345/173 |
| 6,229,694 | B1 | * | 5/2001 | Kono | 361/679.3 |
| 6,295,639 | B1 | * | 9/2001 | Van Der Meer | 717/103 |
| 6,313,828 | B1 | * | 11/2001 | Chombo | 345/169 |
| 6,415,316 | B1 | * | 7/2002 | Van Der Meer | 709/203 |
| 6,741,994 | B1 | * | 5/2004 | Kang et al. | 707/102 |
| 2002/0083469 | A1 | | 6/2002 | Jeannin et al. | |

(Continued)

FOREIGN PATENT DOCUMENTS

WO       WO 99/22338       *    5/1999

OTHER PUBLICATIONS

"Customize;" Merriam-Webster; www.M-W.com; pp. 1-3.*
"Edit;" Merriam-Webster; www.M-W.com; pp. 1-2.*

*Primary Examiner* — Andrew Dyer
(74) *Attorney, Agent, or Firm* — Edell, Shapiro & Finnan LLC (57) ABSTRACT

An interactive multimedia diary system is presented. The system can include one or more interfaces for media content devices (e.g., communications devices, still or video cameras, audio devices, or any other suitable media content storing or generating devices). An interactive multimedia diary can be composed by collecting and arranging a plurality of media types (e.g., images, video, audio, text, etc.). Alternatively, other suitable data collections such as a journal, a scrapbook, an album, a log, a notebook, or a memoir can be composed. The system can prompt a user for input based on input previously entered. The system can scan input text for keywords, such as verbs associated with common activities, previously used or new names, locations, or any other suitable concepts and prompt the user for more information.

23 Claims, 8 Drawing Sheets

(56) References Cited

U.S. PATENT DOCUMENTS

| | | | |
|---|---|---|---|
| 2003/0156381 A1* | 8/2003 | Lieu et al. | 361/681 |
| 2004/0064338 A1* | 4/2004 | Shiota et al. | 705/1 |
| 2004/0067475 A1* | 4/2004 | Niddrie et al. | 434/236 |
| 2004/0180688 A1* | 9/2004 | Siversson | 455/550.1 |
| 2004/0267730 A1* | 12/2004 | Dumais et al. | 707/3 |
| 2005/0105374 A1* | 5/2005 | Finke-Anlauff et al. | 365/232 |
| 2005/0108233 A1* | 5/2005 | Metsatahti et al. | 707/9 |
| 2005/0108644 A1 | 5/2005 | Finke-Anlauff et al. | |
| 2005/0138066 A1* | 6/2005 | Finke-Anlauff et al. | 707/104.1 |
| 2005/0209887 A1 | 9/2005 | Pollner | |
| 2006/0184566 A1* | 8/2006 | Lo et al. | 707/102 |
| 2008/0263067 A1* | 10/2008 | Diederiks et al. | 707/100 |

\* cited by examiner

INTERACTIVE MULTIMEDIA DIARY

RELATED APPLICATIONS

This non-provisional patent application claims priority to and the benefit of U.S. Provisional Patent Application Ser. No. 60/739,946, filed Nov. 28, 2005, the entire contents of which are incorporated herein.

BACKGROUND

Diaries play a significant role in many people's daily lives. Traditionally, diaries have been recorded by hand and kept as a paper journal. Diaries are used to record events, keep personal reminders, and reflect on accomplishments and life in general.

SUMMARY

In one embodiment, an interactive multimedia diary system is presented. The system includes one or more interfaces for media content devices (e.g., communications devices, still or video cameras, audio devices, or any other suitable media content storing or generating devices). In one embodiment, an interactive multimedia diary can be composed by collecting and arranging a plurality of media types (e.g., images, video, audio, text, etc.); however, it should be noted that in other embodiments other suitable data collections such as a journal, a scrapbook, an album, a log, a notebook, or a memoir can be composed.

In one embodiment, the interactive multimedia diary system is implemented using a processing device to control the exchange and formatting of data between device/interfaces and to compile the media types to facilitate the creation of an interactive multimedia diary under input and/or direction from a user. The system preferably provides the user with default presentation formats that are customizable by the individual user; however, the system is not required to provide default presentation formats.

In one embodiment, the system enables a user to use tools associated with the interface to create a personal interactive multimedia diary. In one embodiment, the interactive multimedia diary system interface prompts the user to enter, select, and/or arrange the various media types; however such prompting is not required. In one embodiment, the system enables a user to update and/or edit a previously created diary; however, systems are not required to enable editing of previously entered or arranged content.

In another embodiment, a user can share some or all of an interactive multimedia diary with others. In one embodiment, the system is capable of transmitting a copy of some or all of the interactive multimedia diary to another user. The copy can be transmitted in any suitable manner, including a wired or wireless transmissions between two devices directly or via a network such as the Internet. For example, a user can share some or all of an interactive multimedia diary by posting to a website (e.g., myspace, a personal site or any other suitable site). In one embodiment, the website or the posted portion of the interactive multimedia diary is secured so that only desired users can access the portion of the interactive multimedia diary. The website or portion can be secured in any suitable manner, including but not limited to password protection and encryption techniques.

In an alternative embodiment, the shared interactive multimedia diary or portion of an interactive multimedia diary is uniformly maintained amongst sharing users. As a result, changes or additions made by one sharing user are viewable by the other sharing users.

In another embodiment, the system is capable of printing some or all of an interactive multimedia diary. Video data in the printed portion can be represented by any suitable symbol, including one or more images from the video or can be left out of the printed portion. Similarly, audio data in the printed portion can be represented by any suitable symbol, including one or more text segments extracted from the audio data by a speech recognition device. The printed portion can be printed in any suitable manner on any suitable paper or other substance, including paper configured for insertion into another paper-based diary.

In one embodiment, the system prompts a user for input based on input previously entered. For example, the system scans input text for keywords, such as verbs associated with common activities, previously used or new names, locations, or any other suitable concepts and prompts the user for more information. The prompt can be associated with previous input or responses. For example, if a user previously wrote about a friend starting to date someone and begins writes about that friend again, the system can prompt the user for more information about how the relationship is going (e.g., "Are Jenny and Jose still dating?"). In another embodiment, the system can search (e.g., on the Internet) for new information about a keyword and provide the user with the opportunity to learn more about the subject (e.g., "You were stung by a bee today. Would you like to learn more about bees?", "You're writing about Jennifer Aniston. Would you like to read the latest news about her and Vince Vaughn?", etc.).

Additional features and advantages are described herein, and will be apparent from, the following Detailed Description and the figures.

DETAILED DESCRIPTION

In one embodiment, an interactive multimedia diary system is presented. The system includes one or more interfaces for media content devices (e.g., communications devices, still or video cameras, audio devices, or any other suitable media content storing or generating devices). In one embodiment, an interactive multimedia diary can be composed by collecting and arranging a plurality of media types (e.g., images, video, audio, text, etc.); however, it should be noted that in other embodiments other suitable data collections such as a journal, a scrapbook, an album, a log, a notebook, or a memoir can be composed.

In one embodiment, the interactive multimedia diary system is implemented using a processing device to control the exchange and formatting of data between device/interfaces and to compile the media types to facilitate the creation of an interactive multimedia diary under input and/or direction from a user. The system preferably provides the user with default presentation formats that are customizable by the individual user; however, the system is not required to provide default presentation formats.

In one embodiment, the system enables a user to use tools associated with the interface to create a personal interactive multimedia diary. In one embodiment, the interactive multimedia diary system interface prompts the user to enter, select, and/or arrange the various media types; however such prompting is not required. In one embodiment, the system enables a user to update and/or edit a previously created diary; however, systems are not required to enable editing of previously entered or arranged content.

In another embodiment, a user can share some or all of an interactive multimedia diary with others. In one embodiment, the system is capable of transmitting a copy of some or all of the interactive multimedia diary to another user. The copy can be transmitted in any suitable manner, including a wired or wireless transmissions between two devices directly or via a network such as the Internet. In an alternative embodiment, the shared interactive multimedia diary or portion of an interactive multimedia diary is uniformly maintained amongst sharing users. As a result, changes or additions made by one sharing user are viewable by the other sharing users.

In another embodiment, the system is capable of printing some or all of an interactive multimedia diary. Video data in the printed portion can be represented by any suitable symbol, including one or more images from the video or can be left out of the printed portion. Similarly, audio data in the printed portion can be represented by any suitable symbol, including one or more text segments extracted from the audio data by a speech recognition device. The printed portion can be printed in any suitable manner on any suitable paper or other substance, including paper configured for insertion into another paper-based diary.

Physical Architecture of Various Embodiments

Figure 1:
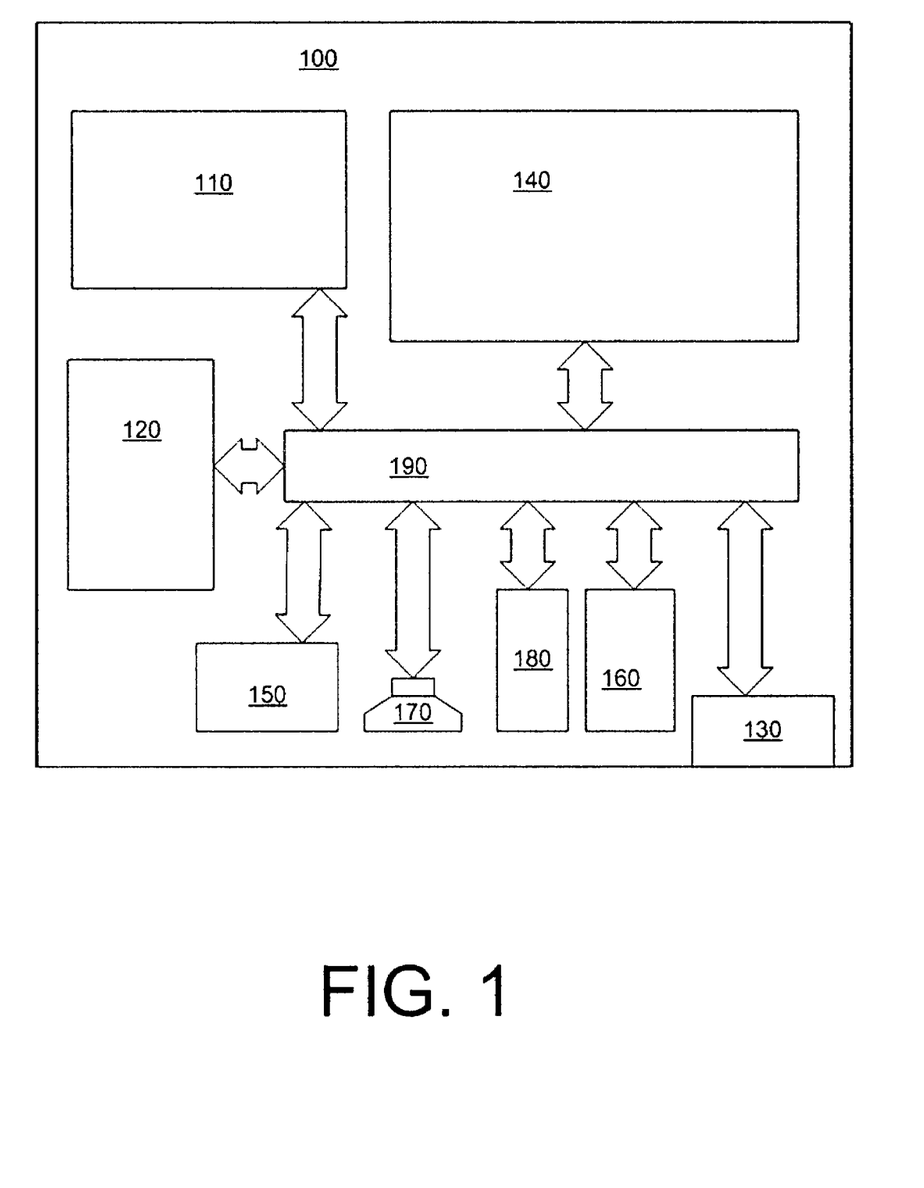
FIG. 1 is a block diagram of an interactive multimedia diary system in accordance with one embodiment.

In various embodiments, the interactive multimedia diary system includes various software and hardware components. In an example embodiment, as shown in FIG. 1, the interactive multimedia diary system 100 is implemented using a processing device 110 and a memory 120. Other components include an I/O interface 130, a display 140, a user interface 150, a transceiver for wireless communications 160, a speaker 170, a microphone 180, and a communications device or bus 190 to exchange data between the various components. These components are incorporated in a single device; however, it should be noted that in other embodiments one or more components are provided as separate devices, such as, for example, peripheral devices.

The processing device 110 can be implemented in various embodiments using a general-purpose or a special purpose computer, such as, for example, a processor, a digital signal processor (DSP), a microcomputer, or a microprocessor capable of responding to and executing instructions in a defined manner. It should also be appreciated that the processing device 110 can be implemented in various standalone devices including, but not limited to, a personal data assistant (PDA), a digital tablet/pad computer, a hand held computer, a game system, a personal computer, a notebook computer, a client device, a work station, a mobile phone, a digital camera, a digital video recorder, a digital video camera, an iPod, a Zune, an MP3 player, a dictation device, a digital book, a personal web page generator or any other suitable device. The processing device can run one or more software applications including an interactive multimedia diary system interface application to command and direct the processor. The software applications can include a computer program, a piece of code, an instruction, or some combination thereof, for independently or collectively instructing the processing device to operate as desired. The processor also can access, store, manipulate, and create data in response to the applications.

In various embodiments, the applications and data can be embodied permanently or temporarily in any type of machine, component, physical or virtual equipment, storage medium, or propagated signal wave capable of providing instructions to or being interpreted by the processing device 110. In particular, the applications or data can be stored by a storage medium or memory 120 including volatile and non-volatile memories (e.g., a read only memory (ROM), a random access memory (RAM), a flash memory, a floppy disk, a hard disk, a compact disk, a DVD, a tape, a DROM, a flip-flop, a register, an SRAM, DRAM, PROM, EPROM, OPTROM, EEPROM, NOVRAM, or RAMBUS), such that if the memory is read by the processor, the specified steps, processes, and/or instructions are performed. The memory 120 can include an interface, such that data and applications can be loaded and stored in the memory allowing the applications, programming, and data to be updated, changed, or augmented. The memory 120 can be removable, such as, for example, a card, a stick, or a disk that is inserted in or removed from the processing device.

The I/O interface 130 is provided in one embodiment to exchange data with the components of the interactive multimedia diary system using one or more communications paths. The interface 130 can be implemented in various embodiments as part of the processing device 110 or separately to allow the processing device 110 to communication with other devices, such as, for example, a memory device 120, a server, a networks, the Internet, a mobile phone, a personal data assistant (PDA), a digital tablet/pad computer, a hand held computer, a game system, a personal computer, a notebook computer, a client device, a work station, a digital camera, a digital video recorder, and/or a digital video camera. The interface 130 can include one or more interfaces, including interfaces for different types of hardware and for different types of communications media and protocols to translate information into a format that can be utilized by the processing device 110. In one example, the interface 130 includes a USB interface. In one embodiment, the interface 130 translates data/information received from the processing device 110 to a format that is transmitted to other devices via a communications path. Thus, the interface 130 allows the processing device 110 to send and receive information using communications paths. It should be noted that one or more of the components and/or functions described herein are not required in various embodiments.

In one embodiment, the communications paths is configured to send and receive signals (e.g., electrical, electromagnetic, or optical) that convey or carry data streams representing various types of analog and/or digital data. In an example embodiment, the communications paths are implemented using various communications media and one or more networks comprising one or more network devices (e.g., servers, routers, switches, hubs, repeaters, and storage devices). The one or more networks can include a LAN, a WAN, a plain old telephone service (POTS) network, a digital subscriber line (DSL) network, an integrated services digital network (ISDN), a synchronous optical network (SONNET), or a combination of two or more of these networks. In addition, the communications paths can include one or more wireless links (e.g., cellular, mobile, GSM, TDMA, and satellite) that transmit and receive electromagnetic signals, such as, for example, radio, infrared, and microwave signals, to convey information.

In one embodiment, the display 140 includes one or more devices including LED, LCD, plasma, CRT, flat panel, DLP, projection, micro display, or touch screen displays. The display 140 is integral to the interactive multimedia diary system in one embodiment, however, the display 140 is connected as a peripheral in another embodiment.

The user interface 150 includes one or more input devices, such as, for example, keys, buttons, switches, knobs, and levers, in addition to keypads, keyboards, touch pads, mice, and touch screens. The one or more input devices enable the user to interact with the interactive multimedia diary system, including the interactive multimedia diary interface application.

The transceiver for wireless communications 160 is used to transmit and receive data with other devices in one embodiment. The wireless transceiver 160 transmits and receives electromagnetic signals, such as, for example, radio, infrared, and microwave signals that convey data and information. It should be noted that other embodiments include a wired transceiver in addition to or instead of the wireless transceiver 160.

In one embodiment, the speaker 170 provides audio data to a user, such as, for example, sound effects, recordings, instructions, and music. Thus, the interactive multimedia diary interface and user interaction are enhanced. It should be noted that in various embodiments the speaker 170 is detached or detachable from other components and can receive audio output via a wire or wirelessly.

In another embodiment, the microphone 180 is used to input audio data from a user or the system's environment to the interactive multimedia diary system. For example, sound bytes (e.g., words or phrases, animal sounds, music, sound effects, etc.) can be created for inserting in the user's interactive multimedia diary.

The communications device or bus 190 is used in one embodiment to exchange data between the various components of the interactive multimedia diary system. The bus 190 can be any suitable type of bus and can have any suitable capacity and/or protocol.

The interactive multimedia diary system also includes one or more power sources in one embodiment to provide power to the one or more components. The power sources can be internal or external, disposable or replaceable (e.g., one or more batteries or rechargeable batteries) or continuous (e.g., a wall outlet, a generator, etc.). In one embodiment, the processing device 110 provides a time out feature which places the device in a standby, sleep or off mode to conserve power after a period of inactivity. The inactivity period that results in a standby, sleep or off mode can be fixed or adjustable by the user and can be dependent upon the amount of power remaining (e.g., the inactivity period is 5 minutes if the power remaining is 50% of capacity or more, but 1 minute otherwise).

In one embodiment, a plurality of applications are used to provide a user interface for the interactive multimedia diary system. In one embodiment, the applications include a browser that enables the user to manipulate various media types. In another embodiment, the interface provides programming that enables a user to access, download, or integrate content, such as, text, audio, video, and pictured data from one or more sources, such as, for example, a memory device, a server, a networks, the Internet, a mobile phone, a personal data assistant (PDA), a digital tablet/pad computer, a hand held computer, a game system, a personal computer, a notebook computer, a client device, a work station, a digital camera, a digital video recorder, a digital video camera, and a microphone. The media types are formatted and stored in a memory device for use with the interactive multimedia diary system.

Displays and Operation of Various Embodiments

In various embodiments, the interface includes a screen that has one or more windows and/or frames to create a diary virtual workspace in which a user may create, edit, and/or customize one or more pages of the interactive multimedia diary. In one embodiment, the windows/frames correspond to certain media types. In another embodiment, various menus and/or tool bars are provided to enable a user to customize the screen.

In an exemplary embodiment, a portable video and/or still camera is used to capture the events of the day. The interactive multimedia diary system interface accesses photos and stills taken by a user and stored in the camera using an interface, such as a USB port for storage in a memory device. Alternatively, the interactive multimedia diary system and the portable video and/or still camera are integrally arranged as one device. In one embodiment, the interface application enables the user to create one or more "pages" corresponding to the day's events. It should be noted that pages can be arranged in any suitable manner and can correspond to one or more events or other items associated with any suitable time period.

In one embodiment, the user is able to enter text user using the interface. The text is displayed in a particular font (e.g., as hand written script on a "notebook page") that is depicted on a virtual page of the display screen associated with the interface in one embodiment; however, in other embodiments, the text is displayed in any other suitable manner.

In one embodiment, the stored photos, stills or video are shown in a frame or window of the interface (or as separate window or file). Further, the image information is selectable (e.g., for display in a larger area, or for copying or relocation) by a user in one embodiment. In one embodiment, the photos, stills, videos or other image data can be "dragged" into a window or frame on the virtual page to be added to, accessed by, or linked to the virtual page. The collection of "pages" for a time period (e.g., a day) can be stored as one or more files or other data structures in a memory device. The interactive multimedia diary can be viewed, saved, backed up, copied and shared with others in any suitable manner.

Virtual pages can also include audio files or any other suitable information type in various embodiments. For example, the user can record messages using the microphone or audio files accessed from the memory or a device, such as a cell phone or voice mail. Special effects can also be included, for example, to accentuate user actions or enhance user interaction with the interactive multimedia diary system.

In one embodiment, the interactive multimedia diary is presentable as a web page. In another embodiment, access to some or all of the interactive multimedia diary requires entry of user identification and/or a password or biometric information (e.g., finger or thumb scan). In one embodiment, a user can grant access to view and/or share some or all of the interactive multimedia diary with one or more special friends.

In one embodiment, the interface assists the user in creation of an interactive multimedia diary. For example, the interface is configured to prompt a user to select from a plurality of different designs, wall papers, backgrounds, configurations, layouts, inputs, special effects, and media types. In another embodiment, the system also suggests various options, configurations, or even default formats for the diary to assist the user based upon characteristics of the user (e.g., young girl, teenager, adult, etc).

In still another embodiment, the system prompts the user using questions for additional information about daily events. For example, the system poses questions, such as "What did you do after school?", "Did you have any cool friends over today?", "Did you meet any cool new friends today at school?" In one embodiment, the system is configured to determine key words from user entries to develop further questions, for example, if the user enters "Today we took a trip on the train to New York city;" the interface may prompt the user "What did you do in New York City?" or "Did anything happen on the train?"

In one embodiment, the interface creates and updates a database of people/places/things for the user. For example, when a user enters "Today we" the interface generates a list of people that the user has previously written about and provides a list or menu of names for user selection by the user. The interface then replace "we" with all of the selected names. Alternatively, the interface creates a link to one or more other entries about the names involved. In one embodiment, the interface also associates the names with pictures and videos or previously saved/selected pictures of the individuals to be displayed on the page.

When a page of the interactive multimedia diary is viewed in one embodiment, the interface generates hyperlinks for various people, places, and information presented by the virtual page of the interactive multimedia diary. When viewing the interactive multimedia diary, a user can select one or more of the links to view additional data, past pages of the interactive multimedia diary, previously defined people/places/things associated with that item, or additional information gathered by a search (e.g., an Internet search) on the item.

Figure 2:
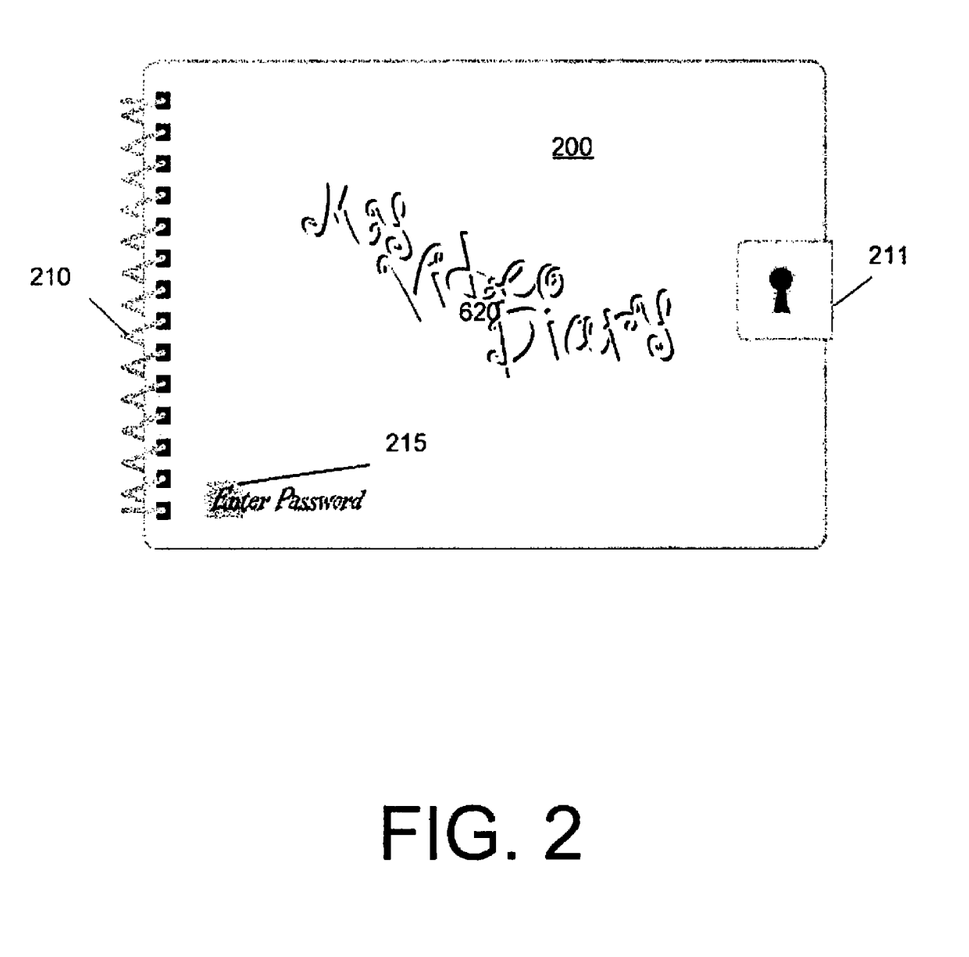
FIG. 2 is a diagram of a cover page of an interactive multimedia diary in accordance with one embodiment.

FIGS. 2-6 illustrate exemplary displays of a interactive multimedia diary system in accordance with one embodiment. As shown in FIG. 2, a page 200 resembles a notebook with spirals 210 and lock indicia 211 to symbolize that the interactive multimedia diary is locked or lockable. A password prompt 215 is provided in which a user can enter the appropriate password to unlock the interactive multimedia diary.

Figure 3:
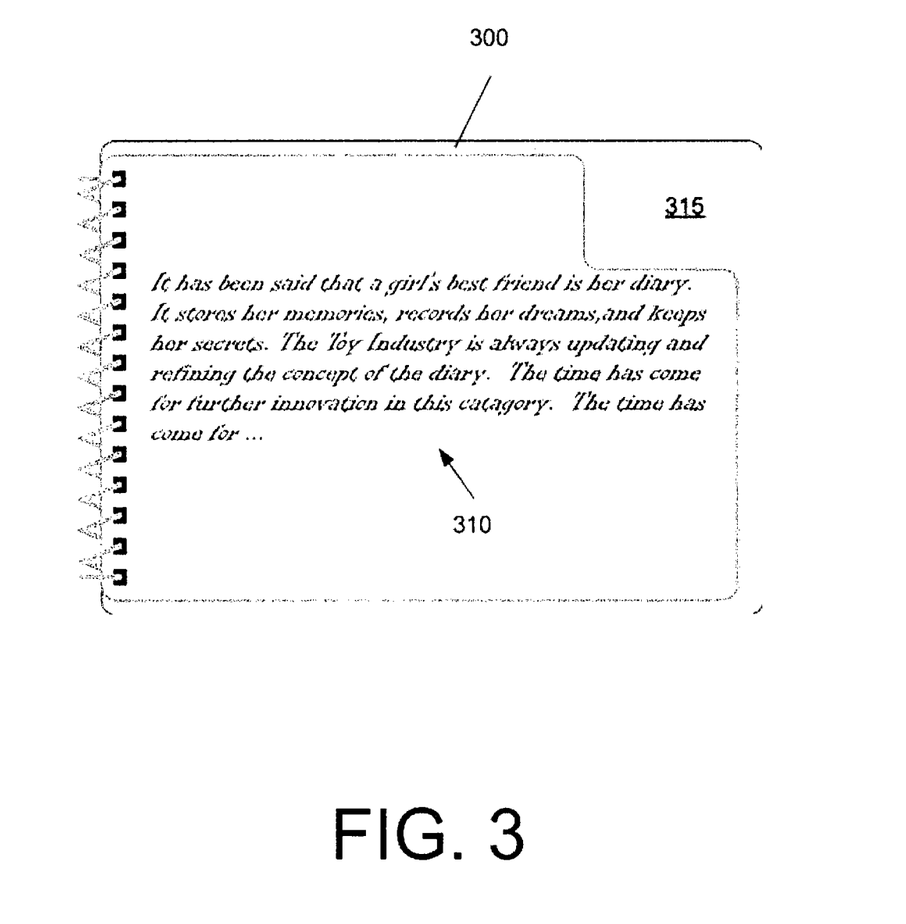
FIG. 3 is a diagram of an internal page of an interactive multimedia diary in accordance with one embodiment.

FIG. 3 shows an internal page of the interactive multimedia diary. The page 300 includes a text area 310 in which text is entered and/or displayed. The page 300 also includes a tab area 315. Tab area 315 can include a display for image data, audio data or any other suitable data. Tab area 315 can also include one or more buttons for navigating forward or backwards in the interactive multimedia diary (e.g., a calendar with links) or for starting a new page.

Figure 4:
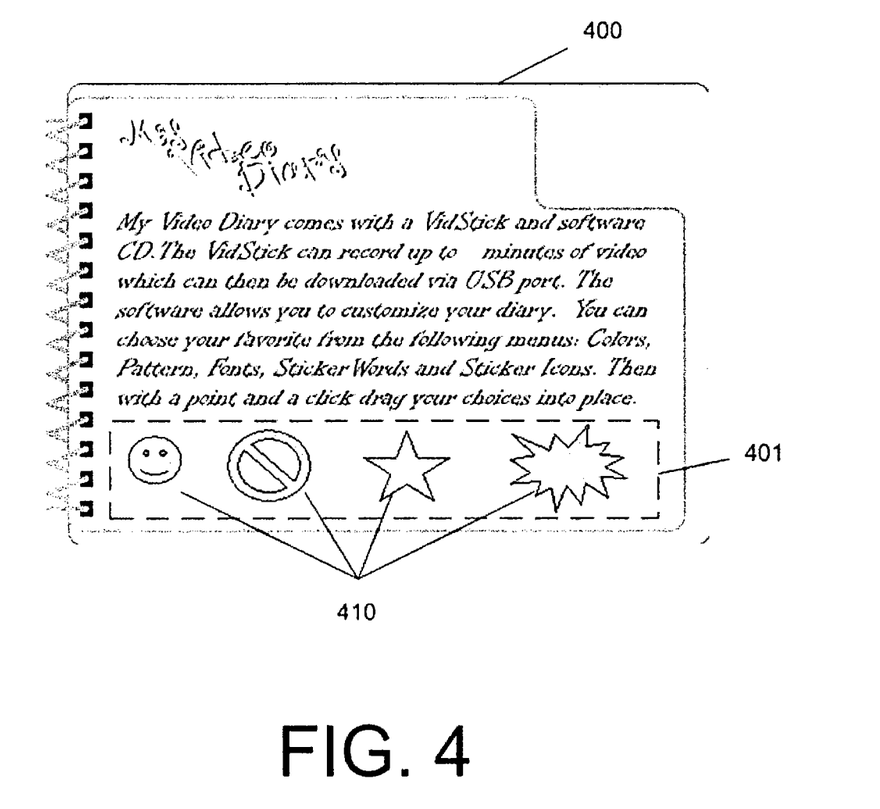
FIG. 4 is a diagram of a page of an interactive multimedia diary having a list of items for possible insertion into the page in accordance with one embodiment.

As shown in FIG. 4, the display of a virtual page 400 can include a list or frame 401 of images or other items 410 which can be dragged and dropped into the virtual page 400 for user customization. The frame 401 can include a standard set of images (e.g., smiley faces, hearts, etc.) or can be customized to the user automatically (e.g., most recent items linked to some page) or manually (items indicated as "favorites" by the user) or a combination thereof. In one embodiment, the frame 401 is displayed while the page 400 is being edited, but not at other times.

Figure 5:
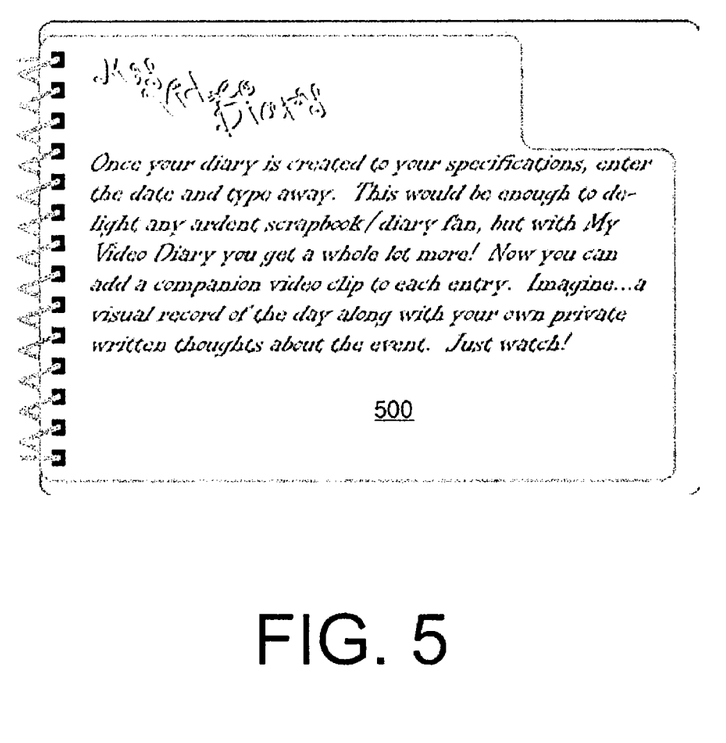
FIG. 5 is a diagram of an internal page of an interactive multimedia diary having a diary title in accordance with one embodiment.
Figure 6:
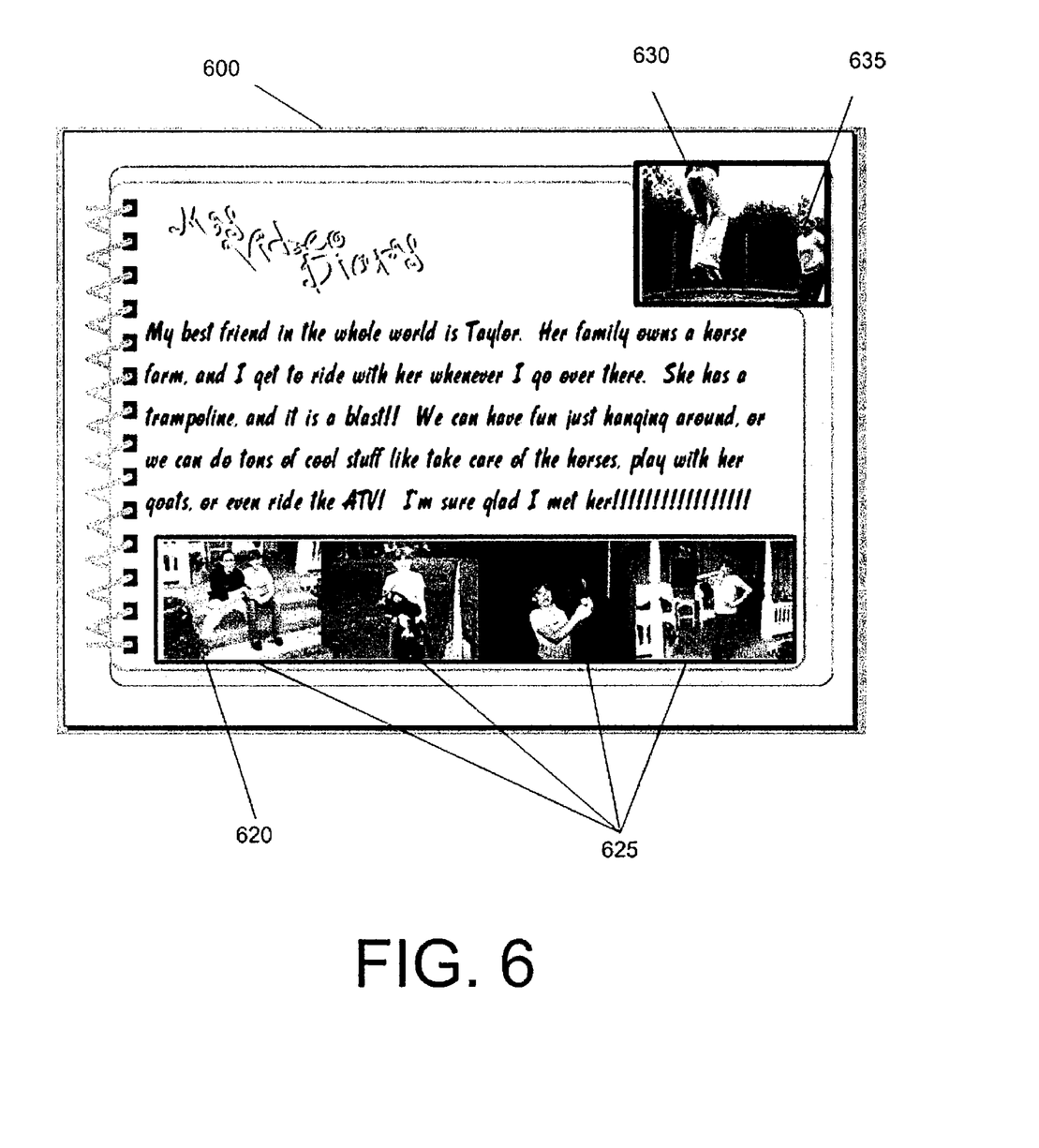
FIG. 6 is a diagram of an internal page of an interactive multimedia diary that includes image data in accordance with one embodiment.

As shown in FIG. 5, a virtual page 500 similar to the one shown in FIG. 3, can include a title in a title area (in this case, "My Video Diary"). FIG. 6 shows a virtual page 600 that includes a text area, a window 620 for picture stills 625, and a video window 630 to access and/or play a video 635 associated with the page. It should be appreciated that videos can include audio data in addition to image data.

Various Stand Alone Embodiments

Figure 7:
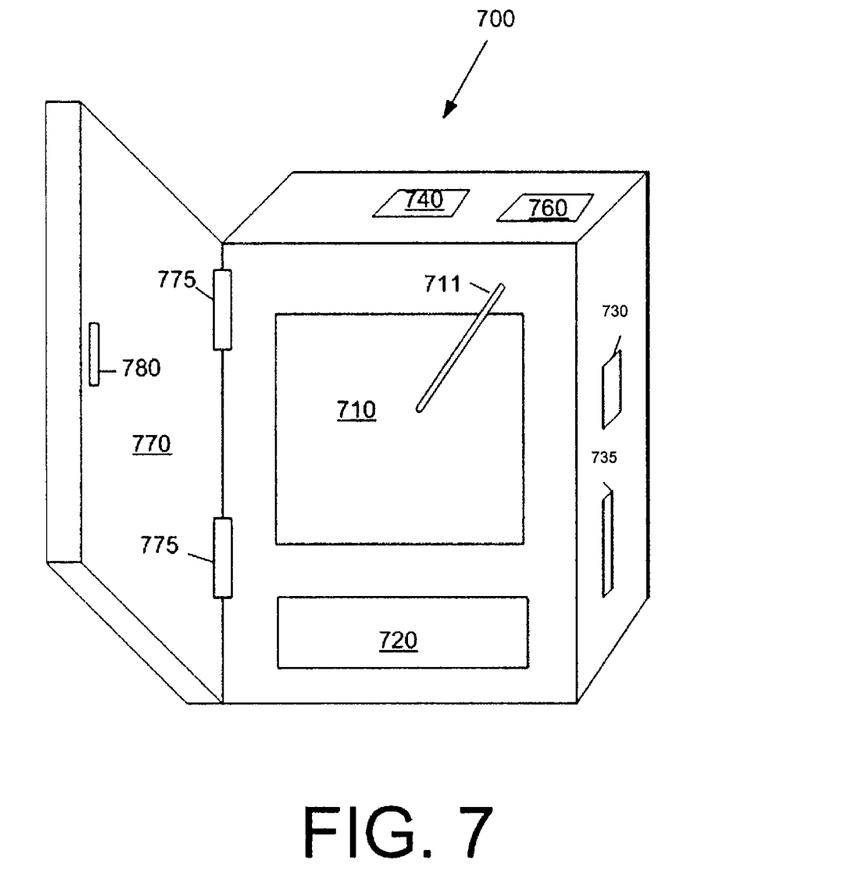
FIG. 7 is a diagram of a stand alone version of an interactive multimedia diary system in accordance with one embodiment.

In one embodiment, as shown in FIG. 7, the interactive multimedia diary system is implemented in a stand alone device 700. The stand alone interactive multimedia diary system 700 can be implement in any suitable device, including but not limited to a mobile phone, a personal data assistant (PDA), a still and/or video camera, digital tablet/pad computer, a hand held computer, a game system, a personal computer, a notebook computer, a client device, a work station, or other processing device. In one embodiment, the stand alone interactive multimedia diary system 700 includes a display 710, a stylus 711 for use with a touch screen, a user interface 720, a microphone 730, a speaker 735, communication port 740, a wireless transceiver, and a digital picture/video camera 760. The stand alone interactive multimedia diary system 700 includes a cover 770 to protect the display 710 and/or user interface 720. The cover 770 is connected using a device such as a hinges 775; however, the cover 770 can be detachably coupled to the stand alone interactive multimedia diary system 700. The cover 770 is securable by a fastening device 780, such as a latch or clasp. The stand alone interactive multimedia diary system 770 can also include interfaces to accept and/or share data with other media creation devices, including but not limited to a digital camera, a digital video recorder, a digital video camera, and a microphone. In another example, the stand alone interactive multimedia diary system 700 has a housing that is shaped to resemble a physical dairy, book, or journal.

Various media types are supported by the interactive multimedia diary system, in various embodiments. For example, digital video (DV) data can be encoded using varies types such as DV Encoder Type 1 and DV Encoder Type 2. Various file formats can be used such as AVI files, Video for Windows (VfW), DirectShow, MPEG-1 (Moving Picture Experts Group format 1), MPEG-2, MPEG-3, MPEG-4, Quicktime, Real Video, and Windows Media Format (WMF). In one embodiment, digital pictures or images are supported using various formats, including but not limited to QT, Flash, GIF, JPEG, TIFF, BMP, FPX, Photoshop, OpenDML, PNG, PICT, and any other suitable image format. Audio data is stored by the system in one embodiment in various formats, including but not limited to AVI, .WAV, .MP3, .MP4, .M3U, .MP3, .WAV, MIDI, .IVF, .MPEG, .MPG, .MPE, .M1V, .MP2, .MPV2, .MP2V, .MPA, MID, MIDI, .QT, .MOV, AIFF, .AIFC, .AU, .SND, .ASF, .ASX, .WM, .WMA, .WAX, .WMV, .WVX, and any other suitable audio format.

In one embodiment, the interface includes a web browser. A web browser enables a user to display and interact with HTML documents hosted by web servers or held in a file system. Examples of browsers include Microsoft Internet Explorer, Mozilla, Firefox, Opera, Netscape, Safari and Konqueror. Web browsers typically communicate using HTTP (hyper-text transfer protocol) to fetch HTML documents. The file format for content is usually HTML (hyper-text markup language) and is identified in the HTTP protocol using a MIME content type; however, the file format can be XML or any other suitable language. Thus, the browser can support standards-based HTML and XHTML or any other suitable language.

A browser can natively support a variety of formats in addition to HTML, such as the JPEG, PNG and GIF image formats, and can be extended to support more through the use of plug-ins. The combination of HTTP content type and URL protocol specification enables an interactive multimedia diary system to embed images, animations, video, sound, and streaming media into an interactive multimedia diary virtual page. Further, it enables a user to make some or all of the interactive multimedia diary accessible through the Internet.

The stand alone device 700 can include a microbrowser, minibrowser, or mobile browser. A microbrowser is optimized to display HTML or other content effectively for small screens/displays on portable devices and have small file sizes to accommodate the low memory capacity and low-bandwidth of wireless handheld devices. The microbrowser typically sets up a cellular network connection itself and gets content written in XHTML Mobile Profile (WAP 2.0), or WML and HDML DoCoMo Compact HTML (C-HTML). However, some microbrowsers are full-featured Web browsers capable of HTML, WML, i-mode HTML, cHTML, plus CSS, ECMAScript, and plug-ins such as Macromedia Flash.

Content Prompting and Learning

In one embodiment, the system prompts a user for input based on input previously entered. For example, the system scans input text for keywords, such as verbs associated with common activities, previously used or new names, locations, or any other suitable concepts and prompts the user for more information. The prompt can be associated with previous input or responses. For example, if a user previously wrote about a friend starting to date someone and begins writes about that friend again, the system can prompt the user for more information about how the relationship is going (e.g., "Are Jenny and Jose still dating?"). In another embodiment, the system can search (e.g., on the Internet) for new information about a keyword and provide the user with the opportunity to learn more about the subject (e.g., "You were stung by a bee today. Would you like to learn more about bees?", "You're writing about Jennifer Aniston. Would you like to read the latest news about her and Vince Vaughn?", etc.). It should be noted that the searches and other prompts described above can be performed concurrently with the user entering data or can be performed at another time (e.g., when the system is idle or less busy or when the system is connected to the Internet). For example, after the user finishes entering a diary entry, the interactive multimedia diary system can analyze the entry in the context of past entries and/or information obtained from the Internet when the user is not making an entry. When the user activates the interactive multimedia diary system to make another entry, the interactive multimedia diary system can prompt the user based on the analysis to enter additional data or view additional data about the previous entry.

Figure 8:
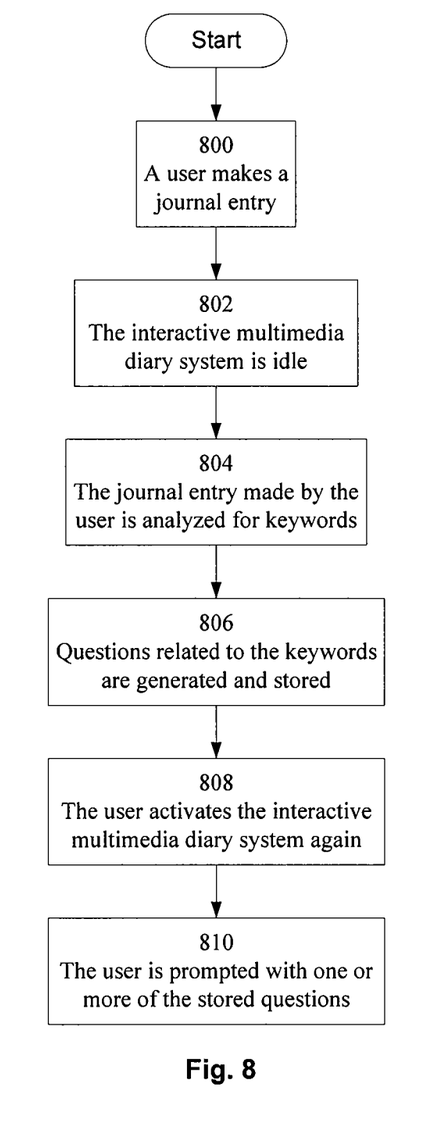
FIG. 8 is a flow diagram of the process of prompting a user for data entry or further learning in accordance with one embodiment.

FIG. 8 illustrates the process of prompting a user for data entry or further learning in accordance with one embodiment. At block 800, a user makes a journal entry. At block 802, the interactive multimedia diary system is idle. At block 804, the journal entry made by the user is analyzed for keywords. At block 806, questions related to the keywords are generated and stored. At block 808, the user activates the interactive multimedia diary system again (e.g., to make another entry). At block 810, the user is prompted with one or more of the stored questions.

In one embodiment, the system can learn new keywords based on input from a user and/or context (e.g., "You are writing about Tom having new grills. What are grills? Is there another name for grills or something that they're similar to?"). In one embodiment, the system includes a categorization system (preferably the categorization system is hierarchical, but it is not required to be hierarchical) the and new keywords are placed in the categorization system based on questions answered by the user. In one embodiment, a new category is created and properties of that category are determined from responses provided by the user. In another embodiment, a new keyword is categorized using a 20-questions-like learning system (e.g., ask questions to get to an end node, then determine and store a difference between the new keyword and the end node. In one embodiment, the interactive multimedia diary system can upload changes to its keyword categorization system to a central categorization system. The central categorization system receives keyword categorization changes from a plurality of different interactive multimedia diary systems and merges the changes into a revised standard categorization system. The interactive multimedia diary system is also operable to download, adapt and use the revised standard categorization system. It should be noted that an interactive multimedia diary system is not required to have a learning keyword categorization system.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A portable electronic diary comprising:
a housing;
a display device coupled to the housing;
a memory device; and
a processor operable with the display device and memory device to enable a user to input a diary entry, analyze the diary entry using a set of keyword information, prompt the user to associate additional information with the diary entry based on the keyword information, modify the set of keyword information in response to the additional information entered by the user for analysis of a subsequent diary entry, and display the diary entry and an indicator of the additional information as a page of a diary.

2. The portable electronic diary of claim 1, wherein the additional information is selected from the group consisting of image data, video data, audio data, another diary entry, a document and a website.

3. The portable electronic diary of claim 1, wherein the diary entry includes text data.

4. The portable electronic diary of claim 1, wherein the processor enabling the user to input the diary entry includes recognizing speech in an audio input.

5. The portable electronic diary of claim 1, wherein the processor enabling the user to associate the additional information with the diary entry includes enabling the user to drag and drop an icon for the additional information onto a display of the diary entry or enabling the user to paste the additional information into the page.

6. The portable electronic diary of claim 5, wherein the icon is the indicator.

7. The portable electronic diary of claim 1, further comprising:
a camera coupled to the housing.

8. The portable electronic diary of claim 7, wherein the camera is selected from the group consisting of a still camera and a video camera.

9. The portable electronic diary of claim 1, further comprising:
a communication device coupled to the housing.

10. The portable electronic diary of claim 9, wherein the communication device is a cellular phone.

11. An electronic device comprising:
a housing;
a display device coupled to the housing;
a memory device; and
a processor operable with the display device and memory device to enable a user to input a data entry, analyze the data entry using a set of keyword information to generate a prompt, prompt the user with the prompt, enable the user to input additional data related to the data entry in response to the prompt, modify the set of keyword information in response to the additional data input by the user, and retrieve additional information based on the modified set of keyword information.

12. The electronic device of claim 11, wherein the data entry is a textual entry and wherein the processor is operable to
display the data entry as a page of a book; and
display, simultaneously with the data entry, the additional data associated with the data entry, the additional data being selected from the group consisting of video data, image data, audio data, a diary entry, a document and hyperlink data.

13. The electronic device of claim 12, wherein the prompt asks the user for more information about a keyword, the keyword being included in the data entry.

14. The electronic device of claim 13, further comprising:
a communications device operable with the processor to transmit the data entry and the additional data, wherein the transmitted data entry and additional data are made accessible to a second user if the second user is authorized to access the transmitted data entry and additional data.

15. An interactive multimedia diary comprising:
an interface configured to receive multimedia data of multiple media types including two or more of text, audio, video, and images and to present a virtual page of the interactive multimedia diary to a user;
an input device configured to receive commands and user data from the user; and
a processor configured to assemble and format the received multimedia data and the received user data to form the virtual page in the interactive multimedia diary in response to the received commands, to analyze the user data using a set of keyword information and suggest additional content to the user for use in the virtual page in the interactive multimedia diary based on the user data or commands, and to modify the set of keyword information in response to additional content suggested and used by the user in the virtual page in the interactive multimedia diary.

16. The diary of claim 15, wherein the interface provides a virtual workspace to create, or edit the virtual page of the interactive multimedia diary.

17. The diary of claim 15, wherein the interface provides one or more windows associated with the virtual page, each window presenting a different media type, and the interface allows the user to drag and drop content of a media corresponding to a first window in the interface.

18. The diary of claim 15, wherein the processor is configured to prompt the user with at least one question about daily events to facilitate creation of the virtual page in the interactive multimedia diary based on the user data or commands.

19. The diary of claim 15, wherein the processor is configured to provide hyperlinks to content in the interactive multimedia diary.

20. The diary of claim 15, wherein the processor is configured to suggest a list of names of other people associated with the user for use in creation of the virtual page in the interactive multimedia diary.

21. The diary of claim 15, wherein the interface presents content of the virtual page to the user and enables the user to interact with the content based on a media type of the content.

22. A method of storing a multimedia recollection of one or more events comprising the steps of:
receiving a diary entry in a field on a display device, the display device operably associated with a processor and a memory device;
analyzing the diary entry using a set of keyword information;
prompting the user to associate additional information with the diary entry based on the set of keyword information;
modifying the set of keyword information to create a new set of keyword information in response to the additional information entered by the user for analysis of a subsequent diary entry; and
displaying the diary entry on the display device and an indicator of the additional information as a page of a diary.

23. The method of claim 22, wherein the additional information is selected from the group consisting of image data, video data, audio data, another diary entry, a document and a web site.

* * * * *